INVENTOR.
LAWRENCE J. KAMM
BY Robert Irving Williams

June 24, 1958     L. J. KAMM     2,840,771
POSITIONING SERVOMECHANISM
Filed Feb. 9, 1955     4 Sheets-Sheet 2
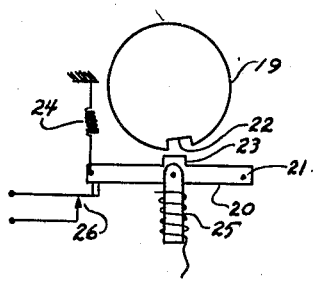
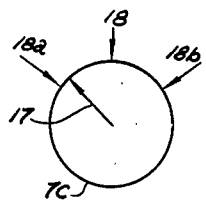
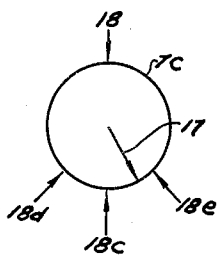
*Fig. 2*     *Fig. 3*     *Fig. 4*
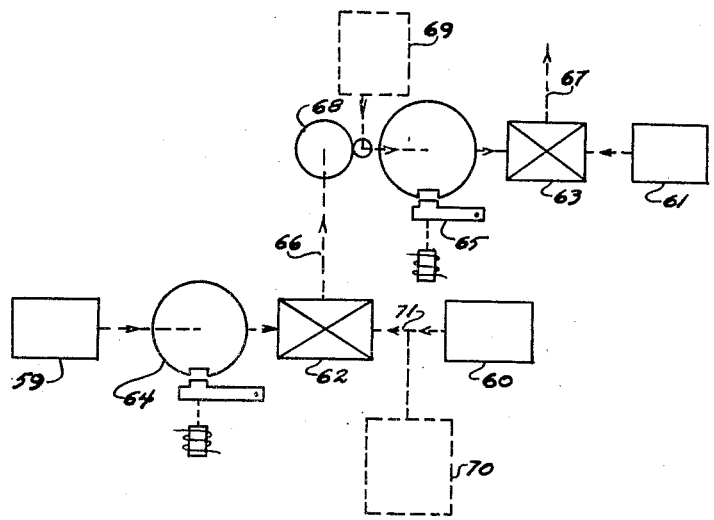
*Fig. 5*
INVENTOR.
LAWRENCE J. KAMM
BY Robert Irving Williams June 24, 1958 L. J. KAMM 2,840,771
POSITIONING SERVOMECHANISM
Filed Feb. 9, 1955 4 Sheets-Sheet 4

INVENTOR.
LAWRENCE J. KAMM
BY
Joseph K. Schofield
ATTORNEY

United States Patent Office 2,840,771
Patented June 24, 1958

2,840,771

POSITIONING SERVOMECHANISM

Lawrence J. Kamm, Forest Hills, N. Y., assignor to Pratt & Whitney Company, Incorporated, West Hartford, Conn., a corporation of Delaware Application February 9, 1955, Serial No. 487,163

13 Claims. (Cl. 318—28)

This invention relates to positioning mechanisms, particularly to high resolution positioning mechanisms of the coarse-and-fine type.

In a machine tool such as a jig borer the resolution required is extremely high and the positioning mechanism may be required to travel from one extreme position to the other extreme position in minimum time. Full scale travel may be 60 inches, with setting increments every $\frac{1}{10,000}$ inch, or 600,000 increments full scale. Even in machines using a common micrometer to subdivide each integral inch, the full scale of the micrometer is 10,000 increments, and the setting must be performed with an accuracy of ½ increment.

Positioning mechanisms of this degree of resolution and accuracy can be made in the coarse-and-fine form, sometimes called the two-speed form. They can be made using as feedback elements (as is done in fire control systems) either precision analog elements such as synchros (machines wherein the electrical relationships between stator and rotor windings are determined by the angular position of the rotor) or digital elements such as commutator switches.

In such mechanisms made heretofore, portions of the fine setting part are coupled to the output during the course setting operation and turn through many complete fine setting cycles during one coarse setting cycle. In continuous servomechanisms such as used in fire control where the output position called for varies in a continuous manner, this is not objectionable. However, in a jig borer it may be desirable to shift from a setting at one end of the scale to one at the other in a minimum of time, and this can produce extreme speeds in the fine setting parts. Therefore, it is an object of this invention to produce a coarse-and-fine positioning mechanism in which the fine positioning part need vary through only one of its own cycles when the output travels through its full range.

In machine tool control and in similar fields, it is desirable to have a positioning mechanism which responds to an input in digital form, (such as coded contact closures) as distinguished from inputs in analog form (such as synchro outputs). It is an object of this invention to produce a novel mechanism of this type.

In positioning a machine tool lead screw, it is desirable always to make the final rotation in the same direction to eliminate the effect of backlash. It is a further object of this invention always to make the final positioning in the same direction regardless of the direction of approach.

It is a further object of this invention to produce an electrical positioning mechanism of high precision using electrical components of relatively low precision.

The invention accordingly comprises the feature, properties, and relation of elements which will be exemplified and hereinafter described, and the scope of the application of which will be indicated in the claims.

For a fuller understanding of the nature and objects of the invention, reference should be had to the following detailed description taken in connection with the accompanying drawings, in which:

Fig. 2 shows the detail of the unitizing means which is a part of the embodiment of Figure 1;

Fig. 3 is a schematic view illustrating an operating condition of the unitizing means;

Fig. 4 is a similar view illustrating another operating condition;

Fig. 5 is a block diagram of a second embodiment;

Figure 1:
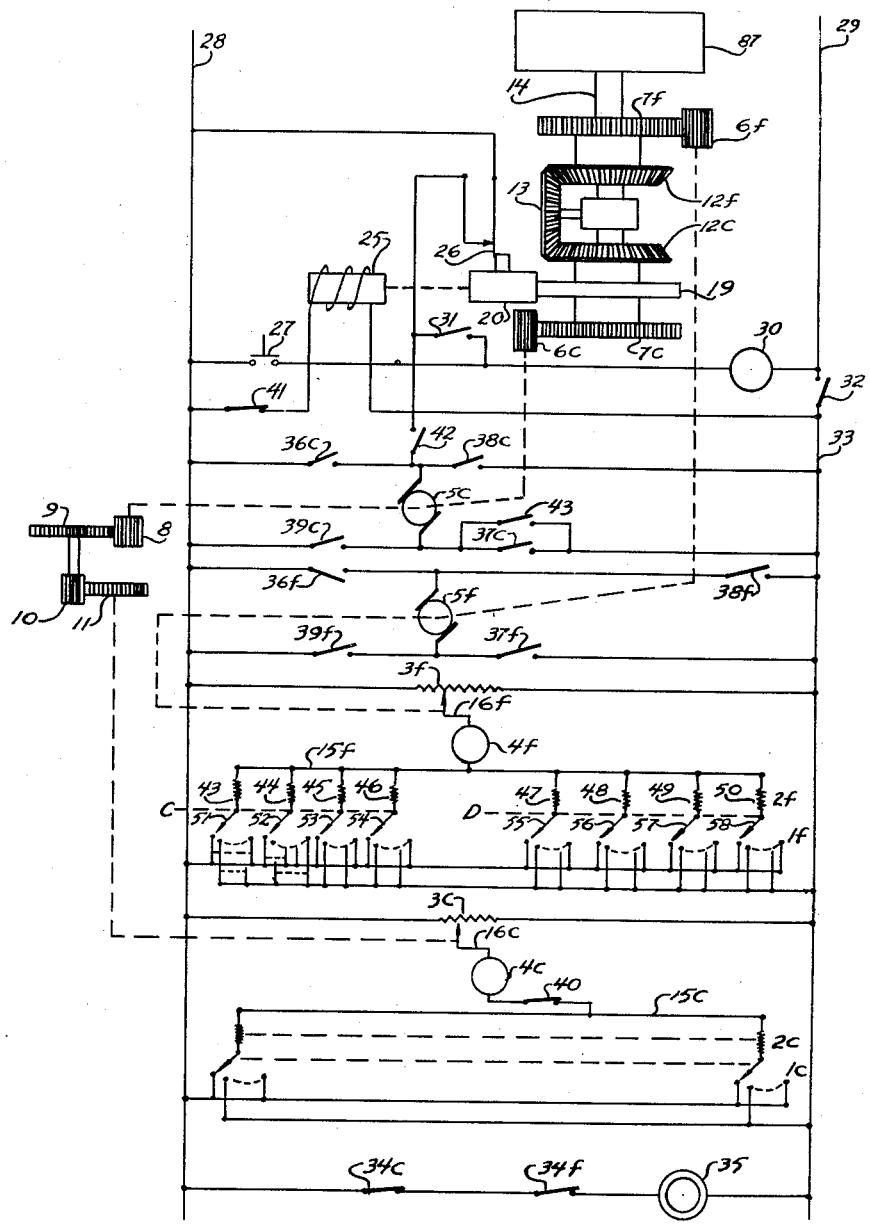
Figure 1 is a diagrammatic view of one embodiment of the invention.

In Figure 1 there are two independent positioning mechanisms, fine and coarse, whose parts are respectively designated by the letters $f$ and $c$. An outline of their operation will be given first and details discussed later.

$1f$ and $1c$ are data inputs digitally defining, respectively, the fine and coarse components of the desired output in the form of switch positions. These switch positions establish analog voltage divisions at points $15f$ and $15c$ by their connections among resistor groups $2f$ and $2c$. These voltage divisions are compared with those established by potentiometers $3f$ and $3c$ by polar relays $4f$ and $4c$. The polar relays energize motors $5f$ and $5c$ in such directions as to drive the potentiometers $3f$ and $3c$ to null positions (i. e., where the potentials at $16f$ and $16c$ are the same as at $15f$ and $15c$ respectively). Coupled to the motor shafts are gears $6f$ and $6c$ which mesh with gears $7f$ and $7c$.

Gear train 8, 9, 10, 11 having an overall ratio of 100:1 lies between gear $6c$ and potentiometer $3c$; but gear $6f$ is directly coupled to potentiometer $3f$. Thus gear $6f$ has a full scale travel of 1 revolution while gear $6c$ has a full scale travel of 100 revolutions. Additional arbitrary (but identical) gear ratios may be interposed between gears $6f$ and $6c$ and potentiometers $3f$ and $3c$ to magnify the full scale gear motions, but the ratio of 100:1 remains unchanged.

Gear $7f$ is coupled to bevel gear $12f$ and gear $7c$ is coupled to bevel gear $12c$. A spider gear 13, coupled to output shaft 14, connects gears $12f$ and $12c$, providing a gear differential. The angular displacement of shaft 14 equals half the sum of the angular displacements of gears $12f$ and $12c$, and therefore corresponds to the sum of the coarse and fine settings on switch groups $1c$ and $1f$. The shaft 14 operates a driven means, such as the jig borer indicated diagrammatically at 87.

If both the fine and coarse setting mechanisms were perfect and had zero error, no more would be needed. However, in a physical embodiment each has some error and these errors must be considered.

Assume for example that the input is in the form of a four-place decimal number between .0000 and .9999, inclusive. Such a number may be represented in general by .ABCD where each of A, B, C, and D is a digit from 0 to 9 inclusive. Let the coarse part be .AB and the fine part be .00CD. Then each setting mechanism need be accurate to only plus or minus .5% to establish a distinguishably unique setting for each of its possible inputs. Let us assume a somewhat better accuracy, namely ±.2%. The overall output on shaft 14 would then correspond to:

$$\frac{\begin{array}{ll}.AB & \pm .002 \\ +.00CD & \pm .00002\end{array}}{.ABCD \quad \pm .00202}$$

Thus the error introduced by the coarse setting would be ⅕ the full scale range of the fine setting, and the system accuracy, which should be within ±.00004, would not obtain. This problem could be solved if the coarse setting means could be made to have an accuracy of ±.00002 (.002%). This I accomplished without recourse to precision components as follows:

One revolution of gear 7c is made to correspond to one count of digit B. If the coarse setting mechanism were perfect, it would always position gear 7c in exactly the same angular position for every value of .AB.

With the assumed accuracy of .2%, the actual position will be ±.2 revolution from this nominal position. This is illustrated schematically in Fig. 3 which shows gear 7c bearing a hypothetical index mark 17. If the nominal set position of 17 is in alignment with fixed index position 18, it will actually be positioned anywhere in the range 18a—18—18b where 18a and 18b are fixed index positions each .2 of the circle away from 18.

A human observer could interpret this position of 17 as being in error and could intervene, after the setting mechanism came to rest, to rotate 7c to bring 17 into alignment with 18. This observer could correctly assume that the setting mechanism had positioned 17 within the correct full revolution and that all he had to do was make the last fractional revolution a unit to remove all error. This operation will be referred to as unitizing. If the unitizing operation be completed with an error of less than .2% of a revolution, gear 7c will be set to .AB±.00002 and the output of the system will be

```
    .AB      ±.00002
  +.00CD     ±.00002
  ─────────────────
    .ABCD    ±.00004
``` which is the desired value and accuracy.

The invention contemplates the provision of means to perform this unitizing operation, which will be described at a later point in this specification.

As described above, the unitizing operation would be in either one direction of rotation or the other, depending on whether 17 overshoots 18 or fails to reach it. If the output shaft 14 is coupled to a machine lead screw or dividing head it is desirable to make the final setting motion always in one direction to eliminate backlash error, regardless of whether the change in setting is an increase or a decrease. This function is incorporated in the unitizing mechanism as follows:

The coarse-setting servo is adjusted to have a nominal setting position 18c (Fig. 4), approximately half a revolution from the true nominal position 18. The offset may be in either direction, but we may assume it to be clockwise for example. The actual coarse setting will then lie somewhere on the arc 18d—18c—18e where 18d and 18e are the accuracy limits corresponding to 18b and 18a in Figure 3. The unitizing motion to bring 17 to 18 now is only counterclockwise, regardless of whether 17 has a positive or a negative error, i. e., is between 18c and 18d or between 18c and 18e. The unitizing operation is sequenced to occur after both coarse and fine setting mechanisms have completed their settings, so the unidirectional final output motion is achieved.

A preferred embodiment of the unitizing means is illustrated in Figs. 1 and 2. Disc 19 is mounted coaxially on gear 7c. Lever 20 is mounted on fixed pivot 21. A notch 22 is cut into the periphery of disc 19 and a mating boss 23 is on lever 20. Spring 24 urges lever 20 toward the disc 19 until boss 23 rests against the periphery of the disc. If the disc is rotated until notch 22 aligns with boss 23, boss 23 will be forced into notch 22 by spring 24, thereby preventing further rotation of the disk 19 and locking it in a unique angular position. Solenoid 25, when energized, overcomes the force of spring 24 and pulls the lever away from the disc. Contacts 26 are closed by lever 20 when boss 23 is not in notch 22 and are opened by lever 20 when boss 23 is in notch 22.

In use, solenoid 25 holds boss 23 disengaged from notch 22 during the operation of the coarse setting mechanism. During the unitizing part of the setting cycle, solenoid 25 is deenergized, spring 24 urges boss 23 against disc 19, and the coarse setting motor is re-energized to rotate 19 in the increasing direction. When notch 22 aligns with boss 23, spring 24 urges the boss into the notch and opens contacts 26 which stop the motor.

The fit of boss 23 in notch 22 can easily be made to have a looseness of much less than the .02 revolution required by the accuracies assumed above. By reducing this looseness the tolerance of the unitized .AB setting is reduced, and the tolerance of the .00CD setting can be increased.

Details of the operation of the embodiment of Figure 1 are as follows:

D. C. voltage is impressed on wires 28 and 29. When start button 27 is momentarily pressed it energizes start relay 30. The start relay locks itself energized by its own contact 31 via unitizing mechanism contact 26, and extends power to the remainder of the circuit by closing contact 32 to connect wire 29 to wire 33. Solenoid 25 operates immediately, closing contact 26 to complete the locking circuit to the start relay and to release the disc 19 and gear 7c for the setting operation.

When wire 33 is energized, voltage is applied to both fine and coarse voltage dividers and potentiometers. If the voltage divisions of the potentiometers do not match those of the voltage dividers, potential differences appear between 15f and 16f and 15c and 16c. These potential differences energize polarized relays 4f and 4c. These are three-position polarized relays. When deenergized they close contacts 34f and 34c which are connected in series with a relay 35. When energized with either polarity they open 34f and 34c and close two other contacts. When energized with a potential difference corresponding to a potentiometer setting lower (in terms of corresponding output position) than the switch setting, they close contacts 36f, 37f and 36c, 37c. This energizes motors 5f and 5c to run in a positive direction to turn the potentiometers until their voltage divisions equal those of the switches. When this condition obtains, the relays release and stop the motors. Similarly, if the initial potential differences were of opposite polarity the polar relays would operate contacts 38f, 39f and 38c, 39c which would energize the motors to run in a negative direction.

The action of both fine and coarse setting systems have been described together, but the systems are independent and one may operate in the positive direction at the same time that the other operates in the negative direction.

The unitizing mechanism is started after both fine and coarse setting mechanisms have completed their work. Contacts 34c and 34f on polar relays 4c and 4f connect voltage to slow-operating relay 35. When power is applied to the circuit, the polar relays operate faster than relay 35 can operate, and deenergize relay 35 with contacts 34c and 34f. When both fine and coarse setting operations are completed, both polar relays close their contacts 34c, 34f and after a brief delay relay 35 operates. When relay 35 operates it immobilizes relay 4c by opening contact 40, deenergizes solenoid 25 by opening contact 41, and energizes coarse setting motor 5c in the positive direction by closing contacts 42 and 43. When boss 23 enters notch 22 (Fig. 2), contact 26 opens, stopping the motor 5c and releasing start relay 30. The setting and unitizing cycle is then complete.

Figure 8:
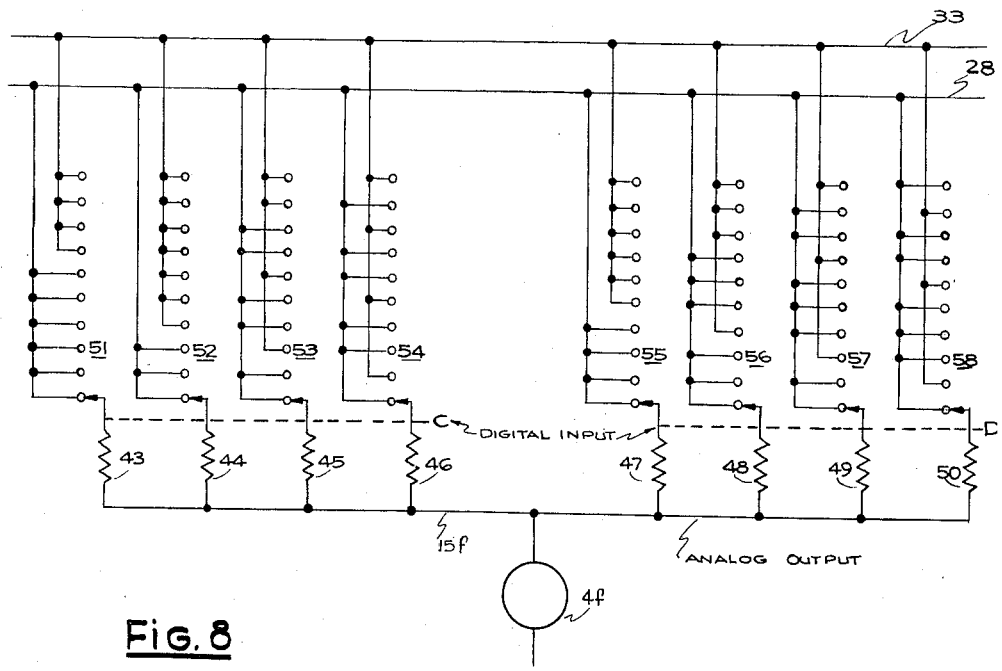
Fig. 8 is a schematic view showing the details of the digital to analogue circuit means used in the embodiments.

The data input voltage divider circuits are novel means to establish voltage divisions with a minimum of resistors. As best shown in Fig. 8, 100 potential steps are established with only 8 resistors. Four resistors are used per decimal digit, resistors 43, 44, 45, 46 for digit C and resistors 47, 48, 49, 50 for digit D in the fine setting mechanism, for example. These resistors are connected either to wire 28 or to wire 33 by ten-position switches 51, 52, 53, 54, 55, 56, 57, 58. Switches 51, 52, 53, 54 are ganged and turned by a single knob which sets digit C. Switches 55, 56, 57, 58 are ganged and turned by a single knob which sets digit D. The relative conductances of the resistors are:

| Resistor | Relative conductance | Digit |
|---|---|---|
| 43 | 30 | C |
| 44 | 30 | C |
| 45 | 20 | C |
| 46 | 10 | C |
| 47 | 4 | D |
| 48 | 3 | D |
| 49 | 2 | D |
| 50 | 1 | D |

The sum of the relative conductances is 100.

If G1 is the sum of the conductances of the resistors switched to wire 33, and G2 is the sum of the conductances of the resistors switched to wire 28 as shown in Fig. 4, then the voltage division is:

$$\frac{\text{Voltage, wire 28 to wire } 15f}{\text{Voltage, wire 28 to wire 33}} = \frac{G1}{G1+G2} = \frac{G1}{100}$$

Since the value of G1 is settable by tens by C switch group 51, 52, 53, 54 and is independently settable by units by D switch group 55, 56, 57, 58, it is settable to any value from 00 to 99 by the corresponding decimal setting of the C and D groups. One typical coding of the switch contacts is as follows (the tabulated number 28 or 33 represents the wire to which the respective resistor is connected):

| Switch No | 51 | 52 | 53 | 54 | 55 | 56 | 57 | 58 |
|---|---|---|---|---|---|---|---|---|
| Resistor No | 43 | 44 | 45 | 46 | 47 | 48 | 49 | 50 |
| Relative Conductance | 30 | 30 | 20 | 10 | 4 | 3 | 2 | 1 |
| Digit: | | | | | | | | |
| 00 | 28 | 28 | 28 | 28 | | | | |
| 10 | 28 | 28 | 28 | 33 | | | | |
| 20 | 28 | 28 | 33 | 28 | | | | |
| 30 | 28 | 33 | 28 | 28 | | | | |
| 40 | 28 | 28 | 33 | 33 | | | | |
| 50 | 28 | 33 | 28 | 33 | | | | |
| 60 | 33 | 28 | 28 | 33 | | | | |
| 70 | 33 | 28 | 33 | 28 | | | | |
| 80 | 33 | 33 | 28 | 28 | | | | |
| 90 | 33 | 33 | 33 | 28 | | | | |
| 0 | | | | | 28 | 28 | 28 | 28 |
| 1 | | | | | 28 | 28 | 28 | 33 |
| 2 | | | | | 28 | 28 | 33 | 28 |
| 3 | | | | | 28 | 33 | 28 | 28 |
| 4 | | | | | 28 | 33 | 28 | 33 |
| 5 | | | | | 33 | 28 | 33 | 33 |
| 6 | | | | | 33 | 28 | 28 | 33 |
| 7 | | | | | 33 | 28 | 33 | 28 |
| 8 | | | | | 33 | 33 | 28 | 33 |
| 9 | | | | | 33 | 33 | 33 | 28 |

A second species of the invention which increases the range of the setting mechanism is shown in Fig. 5. This embodiment is similar to that of Fig. 1 except that the coarse setting mechanism of Fig. 1 is replaced by an entire-fine-and-coarse setting mechanism identical with Fig. 1. With the same forms of code and precision of parts as in Fig. 1 this embodiment has a full scale of six significant figures instead of four. For example, it can make settings of the form MN.ABCD which, in a machine tool, represents increments of .0001 inch for 99 inches.

In detail block 59 represents the coarsest setting mechanism (for digits MN) comprising elements equivalent in Fig. 1 to switches 1c, resistors 2c, polar relay 4c, feedback potentiometer 3c, gear train 8, 9, 10, 11, motor 5c, and gears 6c and 7c. Block 60 represents the intermediate setting mechanism (for digits AB) comprising elements equivalent to the corresponding elements of the fine setting mechanism in Fig. 1. Block 61 represents the fine setting mechanism (for digits CD) also comprising elements equivalent to the corresponding elements of the fine setting mechanism in Fig. 1. 62 and 63 are differential adders similar to gears 12c, 12f, 13 in Fig. 1. 64 and 65 are unitizing mechanisms similar to that in Fig. 2. 66 is an intermediate output shaft similar to 14 in Fig. 1. 67 is the final output shaft similar to 14 in Fig. 1. 68 represents a 100:1 gear ratio which multiplies the output on shaft 66 by 100 before feeding it, via unitizing mechanism 65 to adder 63.

In use, all three setting mechanisms 59, 60, 61 are first operated simultaneously, their outputs are added by adders 62 and 63, and the sum appears on output shaft 67. When all settings have been made, unitizing mechanism 64 is used to unitize the output of coarse setting mechanism 59 (to integral values of digit N). When this operation is completed, unitizing mechanism 65 is used to unitize the combined outputs of coarse setting mechanism 59 and intermediate setting mechanism 60 (to integral values of digit B), using the motor of intermediate mechanism 60.

Since, in practice, it is undesirable to transmit power through a step-up gear train of large ratio such as in gear train 68, the motors may be removed from setting mechanisms 59 and 60 and replaced by common motor 69, shown dotted in Fig. 5. In this case an electrically operated brake 70 is attached to the output shaft 71 of intermediate setting mechanism 60. In use, brake 70 is first energized, and motor 69 is operated as part of coarse setting mechanism 59, its motion being transmitted back through gears 68, shaft 66, and adder 62. Motor 69 is next operated for unitizing under the control of unitizing mechanism 64. Control of motor 69 is then transferred to intermediate setting mechanism 60 which then operates in the same manner. During the operation of mechanism 60, brake 70 is released; but, after the completion of the setting, brake 70 is re-applied. Meanwhile fine setting mechanism 61 has operated. Finally motor 69 is controlled by unitizing mechanism 65 for final unitizing.

Figure 6:
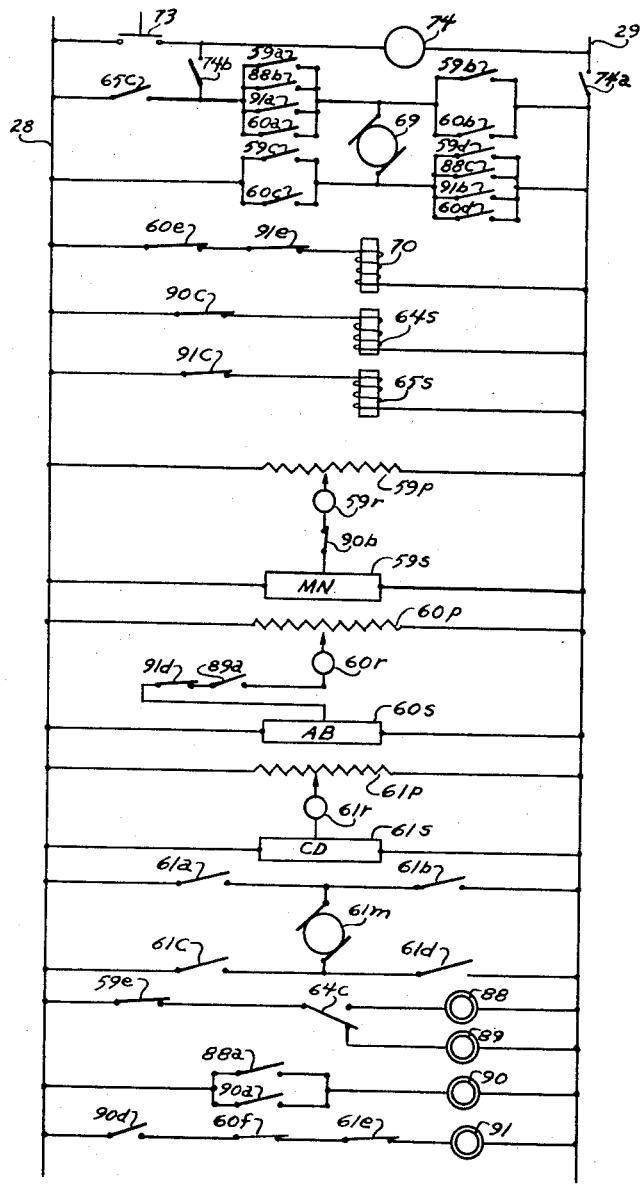
Fig. 6 is a schematic circuit of the embodiment of Fig. 5.

The electrical circuit of the embodiment of Fig. 5 is shown in Fig. 6. Its operation is as follows:

When start button 73 is momentarily pressed relay 74 is operated from voltage supply 28, 29. Relay 74 extends power to the remainder of the circuit via contact 74a and establishes a locking circuit via contact 74b. This circuit is immediately completed by contact 65c of unitizing mechanism 65, whose solenoid 65s is energized when contact 74a closes. At this same time solenoid 64s of unitizing mechanism 64 and brake solenoid 70 are also energized. The three voltage dividers 59s (digits MN), 60s (digits AB), 61s (digits CD) are also energized, together with their corresponding feedback potentiometers 59p, 60p, and 61p.

Polar relay 59r is energized from divider 59s and potentiometer 59p and runs motor 69 via contacts 59a and 59d or 59b and 59c until the condition of potentiometer 59p matches that of divider 59s. After relay 59r remains deenergized for a short time it energizes slow-operating relay 88 via its contact 59e and via contact 64c operated by the solenoid 64s of unitizing mechanism 64. Relay 88 operates relay 90 via contact 88a and energizes motor 69 in the positive direction via contacts 88b and 88c. Relay 90 locks itself in with contact 90a, disconnects polar relay 59r with contact 90b (to prevent its being re-operated by the unitizing operation), and deenergizes unitizing solenoid 64s with contact 90c.

When the unitizing action is completed, contact 64c is restored to normal, causing slow-operating relay 89 to operate and relay 88 to release, deenergizing motor 69. Relay 89 connects polar relay 60r to voltage divider 60s with contact 89a. Polar relay 60r now takes control of motor 69 via contacts 60a and 60d or 60b and 60c. Also it releases brake 70 by opening contact 60e to insure that the motor will turn potentiometer 60p. Meanwhile polar relay 61r has been operating motor 61m via contacts 61a and 61d or 61b and 61c to balance the bridge formed by potentiometer 61p and voltage divider 61s.

When both polar relays 60r and 61r have completed their work and restore to normal they cause slow-operating relay 91 to operate via contacts 90d, 60f, and 61e. Relay 91 operates motor 69 in the positive direction by closing contacts 91a and 91b, releases unitizing solenoid 65s by opening contacts 91c, keeps brake 70 deenergized by opening contact 91e, and prevents re-operation of polar relay 60r by opening contact 91d. When this unitizing operation is completed the mechanism is set and unitizing mechanism contacts 65c open and deenergize motor 69 and relay 74, which deenergizes the entire circuit.

Figure 7:
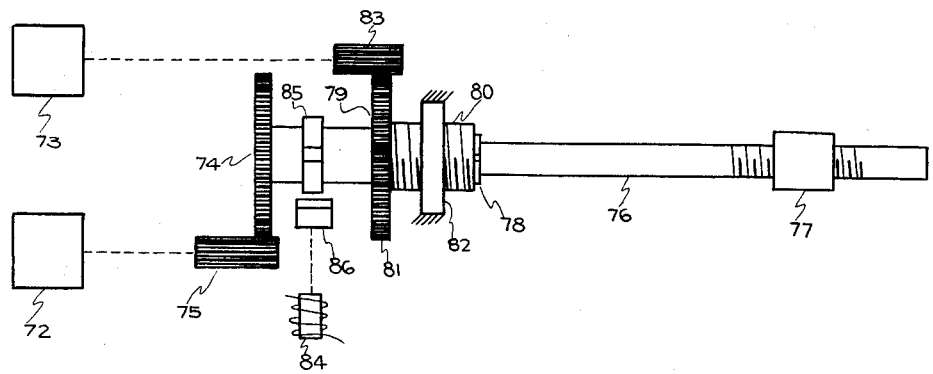
Fig. 7 is a diagrammatic view of a third embodiment.

A third species of the invention is illustrated in Figs. 7 and 8. In this embodiment the output is the position of traveling nut 77 threaded on coarse lead screw 76. Screw 76 is rotatably mounted on the axis of fine lead screw 80, and is constrained against axial motion relative to screw 80 by shoulder 79 and retaining ring 78. Fine screw 80 is threaded into fixed nut 82. Gear 81 on fine screw 80 meshes with pinion 83 driven by fine setting mechanism 73. Fine setting mechanism 73 is similar to the fine setting mechanism of Fig. 1, comprising switches 1f, resistors 2f, polar relay 4f, motor 5f, feedback potentiometer 3f. Gear 74 on coarse screw 76 meshes with pinion 75 driven by coarse setting mechanism 72. Coarse setting mechanism 72 is similar to the coarse setting mechanism of Fig. 2. Disc 85 corresponds to disc 19 and lever 86 corresponds to lever 20.

Pinions 75 and 83 and lever 86 are elongated in the direction of motion to permit their cooperation with their mating parts which move axially with the axial motion due to rotation of fine screw 80.

In use, the coarse setting mechanism 72, coarse lead screw 76, and unitizing mechanism 84 position nut 77 to the nearest integral thread pitch increment of coarse screw 76, and fine setting mechanism 73 and fine lead screw 80 position nut 77 to the desired fraction of that increment.

The details of construction of the above embodiments are intended only as examples of the invention and may be modified without departing from the spirit of the invention or the scope thereof as defined in the appended claims.

I claim:

1. A positioning mechanism comprising a displacement adding means including an output displacement means, a first input displacement means, and a second input displacement means applied to said adding means, the resultant displacement of the output displacement means being proportional to the sum of the displacements caused by said first and second input displacement means; a fine positioning means associated with said first input displacement means; a coarse positioning means associated with said second input displacement means; and a displacement unitizing means coupled to said coarse positioning means.

2. A positioning mechanism as in claim 1 in which said unitizing means always acts in a single direction.

3. A positioning mechanism as in claim 1 in which said second input displacement means comprises a rotating shaft and said displacement unitizing means comprises a first interfering surface rotating with said shaft, a second interfering surface fixed relative to the rotation of said shaft, means to interpose said second interfering surface in the path of said first interfering surface, and means to rotate said shaft.

4. A positioning mechanism as in claim 1 in which said displacement adding means comprises gear differential means.

5. A positioning mechanism as in claim 1 in which said coarse positioning means is a positioning mechanism comprising a rotatable screw, a nut threaded on said screw, the linear displacement of said nut being an output displacement, a coarse positioning means disposed to effect rotation of said screw, rotation-unitizing means coupled to said coarse positioning means, and screw axial positioning means.

6. A positioning mechanism comprising a voltage source having two conductors, an input voltage divider connected to said voltage source and having a reference output conductor, a feedback voltage divider connected to said voltage source and having a feedback output conductor, voltage responsive means connected to said reference output conductor and to said feedback output conductor, a motor controlled by said voltage responsive means and controlling said feedback voltage divider, said input voltage divider comprising a plurality of two-terminal resistors, switching means, each of said resistors being connected at one terminal to said reference output conductor and at the other terminal to said switching means, said switching means connecting said other terminal to one or the other of said two voltage source conductors.

7. A control mechanism comprising a driven member, a control means therefor, a rotatable member forming part of said control means, another rotatable member forming part of said control means, fine control means for operating the first-mentioned rotatable member, coarse control means for operating said other rotatable member, means adapted for halting the rotation of said other rotatable member at a given position in its rotation, and means for selectively operating said halting means.

8. A positioning mechanism comprising a displacement adding means having an output displacement means, a first input displacement means and a second input displacement means, a second displacement adding means, an input displacement means of which is said output displacement means and which has itself an output displacement means and which has an additional input displacement means, the displacement caused by the last mentioned output displacement means being proportional to the sum of the displacement caused by the aforesaid input displacement means; a fine positioning means associated with said additional input displacement means, a coarser positioning means associated with said second input displacement means, and a still coarser positioning means associated with said second input displacement means; a displacement unitizing means coupled to said still coarser positioning means, and a displacement unitizing means coupled to the first mentioned output displacement means.

9. A positioning mechanism according to claim 1 in which said second input displacement means comprises a rotating shaft, said displacement unitizing means comprising a first member fixedly secured to and mounted coaxially with said rotating shaft, said first member having a first control means associated therewith, and a second member having a second control means adapted to coact with said first control means, said second control means defining a reference radius with respect to the coaxial center, whereby upon actuation said first and second control means cooperate to arrest rotation and hold said rotating shaft in predetermined angular position.

10. A positioning mechanism comprising a rotatable screw, a nut threaded on said rotatable screw, the linear displacement of said nut defining an output displacement, a coarse positioning means arranged to effect rotation of said screw, rotation-unitizing means coupled to said coarse positioning means and adapted, upon actuation, to hold said rotatable screw in predetermined angular position, and fine positioning means, cooperatively associated with said rotatable screw to axially displace said rotatable screw in fine increments.

11. A positioning mechanism comprising a first displacement adding means including first output displacement means, first and second input displacement means for applying first and second input signals to said first adding means, a first unitizing means intermediate said first displacement means and said first adding means, for unitizing said first input displacement, means for sequentially isolating said second input displacement means, a second displacement adding means including second output displacement means, a second unitizing means intermediate said first output means and said second adding means for unitizing said second output displacement, and third input displacement means for applying a third input signal to said second adding means, common motor means coupled to said first and second input displacement means and to said first and second unitizing means, whereby in sequence, the second input displacement means is isolated, the first input signal is applied, the first input displacement means is unitized, the isolation means is inactivated, the second input signal is applied, the second input displacement means is isolated, the third signal is applied, and the first output means is unitized, the then resultant displacement of the second output displacement means being proportional to the sum of the displacements of all input signals.

12. A positioning unitizing mechanism comprising a first member secured coaxially to a rotating output shaft and having a first control surface means associated therewith, a second member having a second control surface means adapted to mate with said first control surface means, said second control means defining a reference radius with respect to the coaxial center, means for actuating said second means, means for rotating said output shaft to within approximately one-half revolution of the desired position, said actuating means then energizing said second member until the control surfaces are contiguous, whereby the final accuracy of the output shaft displacement is dependent solely on the dimensional accuracy of the mating surfaces.

13. A position unitizing mechanism according to claim 12 in which said first member is always actuated in the same direction.

References Cited in the file of this patent

UNITED STATES PATENTS

| | | |
|---|---|---|
| 1,693,314 | Murphy | Nov. 27, 1928 |
| 2,534,293 | Newton | Dec. 19, 1950 |
| 2,775,754 | Sink | Dec. 25, 1956 |